United States Patent [19]

Nissen

[11] Patent Number: 4,779,284
[45] Date of Patent: Oct. 18, 1988

[54] GAS LASER WITH COAXIAL GAS RESEVOIR

[75] Inventor: Rudolf F. Nissen, Pescadero, Calif.
[73] Assignee: Spectra-Physics, Inc., San Jose, Calif.
[21] Appl. No.: 31,031
[22] Filed: Mar. 26, 1987
[51] Int. Cl.$^4$ .................................................. H015 3/045
[52] U.S. Cl. ........................................ 372/59; 372/34; 372/61; 372/65; 372/107
[58] Field of Search ............... 372/59, 34, 61, 65, 372/87, 107, 36, 55, 58

[56] References Cited

U.S. PATENT DOCUMENTS 4,625,317 11/1986 Kolb et al. ............................ 372/87

FOREIGN PATENT DOCUMENTS 0060631 9/1982 European Pat. Off. ............... 372/34
0204583 11/1983 Japan ..................................... 372/59
2161319 1/1986 United Kingdom .................... 372/61

Primary Examiner—William L. Sikes
Assistant Examiner—Xuan T. Vo
Attorney, Agent, or Firm—Donald C. Feix; Paul Davis; T. M. Freiburger

[57] ABSTRACT

A gas laser such as an argon or krypton laser has an annular gas reservoir surrounding a laser bore. A series of heat-dissipating fins are connected to the laser bore and extend between the exterior of the laser bore and the interior of the coaxial gas reservoir, arranged so as to allow air to pass over the fins as it travels lengthwise in the annular space between the bore and the gas reservoir. The gas reservoir, which communicates directly with the interior of the bore via one or more tubes, can be supported in position by the fins. The gas reservoir supplies additional makeup gas for the laser bore, as the gas in the bore is slowly consumed over the life of the laser, thereby prolonging the life of the laser without gas recharge. In addition to its storage function, the coaxial annular reservoir also serves to duct cooling air, drawn by a blower, directly over the exterior of the bore and over the cooling fins, greatly improving the cooling efficiency of the laser. The gas reservoir can also act as a thermally stable resonator body for the laser. The gas reservoir can also act as a gas return path for the gas moved by the pumping action of the lasing process in the bore.

12 Claims, 3 Drawing Sheets

GAS LASER WITH COAXIAL GAS RESEVOIR

BACKGROUND OF THE INVENTION

The invention relates to gas lasers, and more particularly to lasers of the argon or krypton type wherein a gas reservoir is needed to supply makeup gas, as gas is consumed over the life of the laser.

Gas lasers, particularly argon and krypton lasers, encounter a slow loss of plasma gas in the laser core or bore. The loss of gas is believed due to the gas atoms becoming buried in the walls of the core by ionic action.

As a solution to this problem, it has been known to provide a gas reservoir for holding additional gas, in permanent communication with the interior of the laser bore. Such reservoirs have often comprised an enlarged end forming part of the laser tube, at the cathode end.

There have also been gas lasers with longitudinal airflow cooling, with ambient air directed lengthwise over the laser tube.

In previous gas lasers there has not been a construction having the dual advantages of providing additional makeup gas and also providing for more efficient cooling of the laser bore through the configuration and position of the reservoir, as in the present invention described below.

SUMMARY OF THE INVENTION

In the present invention a gas laser such as an argon or krypton laser has, surrounding its central bore in coaxial relationship, an annular gas reservoir which may be longer than the laser bore. The annular reservoir is spaced concentrically away from the laser bore so as to define an annular space between the bore and the reservoir, running the length of the mirror cavity.

In accordance with the invention the gas reservoir is connected by one or more tubes to communicate directly with the interior of the laser bore so as to supply makeup gas for the lasing process, greatly extending the life of the laser due to the relatively large volume of the annular reservoir.

Also, another important feature associated with the concentric annular reservoir is that it provides a ducting shroud over the exterior of the laser bore, so that cooling air moved longitudinally by a blower can efficiently cool the bore. For this purpose the laser construction of the invention preferably includes a series of cooling fins in the space between the bore and the reservoir, which may comprise convoluted metal fins brazed to the exterior of the bore tube. The fins preferably also serve the function of supporting the annular reservoir in position surrounding the bore.

The system in which the laser is included has a fan or blower for causing air to move through the annulus of space between the bore and the reservoir, in a longitudinal direction. For this purpose, the reservoir acts as a ducting shroud to direct the moving air in a confined path over the exterior of the bore and over the cooling fins, so that cooling is accomplished more efficiently than would otherwise be the case.

The metal cooling fins, in a preferred embodiment of the invention, are not continuous through the length of the bore but rather are in relatively short longitudinal segments, each being offset rotationally from the next, so that a degree of turbulence is introduced into the flowing air, for better cooling effect on the fins.

Also in the preferred embodiment, a thermal and electrical insulation barrier preferably is positioned between the fins and the interior surface of the annular gas reservoir which they support. This is included to minimize conduction of heat from the laser bore through the fins to the gas reservoir, thereby keeping the reservoir cool. It also allows the reservoir to be non-electric, not carrying the charge of the laser.

The annular gas reservoir may also serve as a resonator for the laser. Because it stays cool, it can be used to support the laser cavity mirrors from its ends, isolating the mirrors from the thermal expansion and contraction of the laser bore structure. It also provides a vibrationally more stable support.

It is therefore among the objects of the present invention to produce a gas laser having a very ample gas reservoir to prolong the working life of the laser, while also using the physical structure of the gas reservoir to duct air over the laser bore for efficient cooling, and also utilizing cooling fins between the laser bore and the surrounding annular reservoir to further assist in cooling of the laser and to support the gas reservoir in the surrounding position.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPION OF THE DRAWINGS

DESCRIPTION OF PREFERRED EMBODIMENTS

Figure 1:
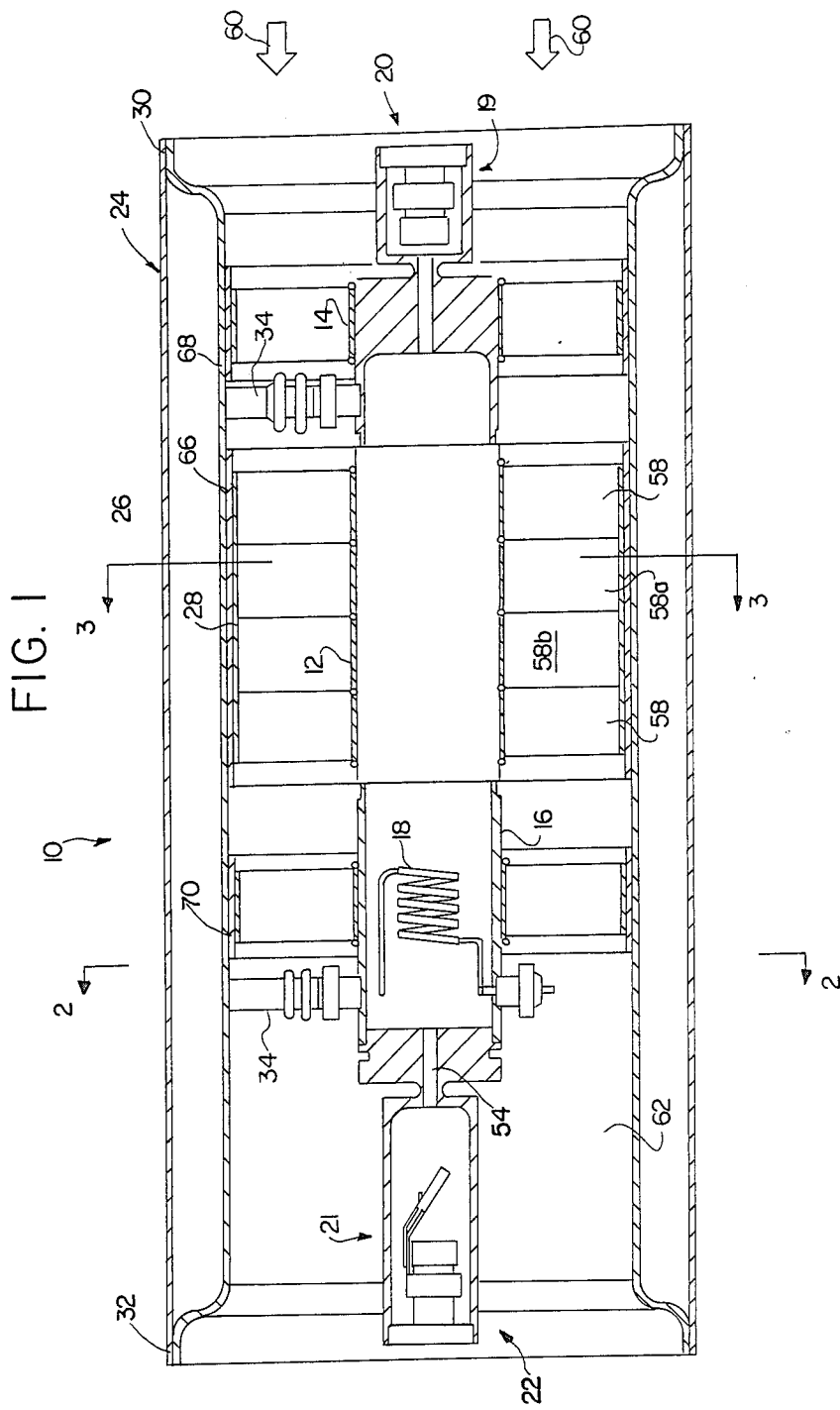
FIG. 1 is an elevation view in longitudinal section of a gas laser such as a krypton or argon laser, including an annular coaxial gas reservoir and cooling fins in accordance with the principles of the invention.

In the drawings, FIG. 1 shows a gas laser assembly 10 embodying the principles of the present invention.

The gas laser 10 includes a laser bore or core 12, an anode tube 14 secured to the bore 12, a cathode tube 16 secured to the bore 12, a cathode filament 18, anode and cathode end mirror assemblies 19 and 21 at anode and cathode ends 20 and 22, respectively, and an annular gas reservoir 24 surrounding the laser assembly 12–22 in coaxial relationship.

The annular gas reservoir 24 includes an outer tube 26 and an inner tube 28 which, as shown in FIG. 1, is secured together with the outer tube 26 in a sealed relationship at rings of contact 30 and 32 at the anode and cathode ends, respectively. The annular gas reservoir 24 is charged with the plasma gas (e.g. argon or krypton gas) used in the laser tube or bore 12, and provides a greatly extended supply of plasma gas for the tube, thereby prolonging the life of the laser as the plasma gas is slowly consumed in the lasing process.

The annular gas reservoir 24 communicates directly with the interior of the laser bore via gas flow tubes 34 connected in sealed relationship between the gas reservoir 24 and the lasing cavity. As shown in the drawing, this may be at several locations, preferably at the anode tube and at the cathode tube, where an end of each gas flow tube is secured around an opening in the anode or cathode tube, as by brazing.

The gas flow tubes extend in arm-like fashion radially outward from the lasing assembly to the interior tube 28 of the gas reservoir, and there may be more than one gas flow tube provided at each of the anode and cathode ends. They may be spaced circumferentially around the anode or cathode tubes, if desired. It is also feasible to have one gas flow tube only and to have gas returns in the core.

Figure 7:
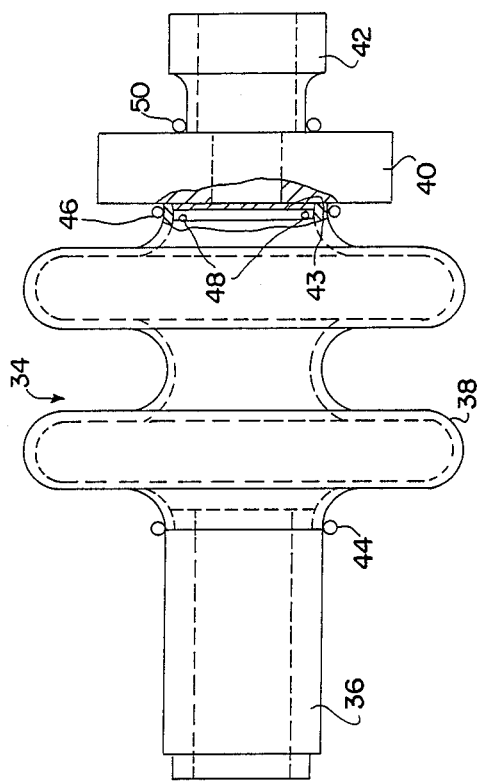
FIG. 7 is a detail view showing a gas conduit leg construction forming a part of both embodiments of the invention.

FIG. 7 shows in greater detail the construction of each of the gas flow tubes 34. Each gas flow tube may comprise a series of connected concentric components, as indicated. Thus, the gas flow tube may comprise a reservoir-end tube 36, welded to the inner tube 28 of the reservoir, a bellows-type section 38 for expansion/contraction, preferably of metal, an insulating section 40 connected to the bellows-type section 38, and a laser-end connector 42 which is appropriately shaped to be connected (as by brazing) to the anode tube 14 or the cathode tube 16. A fine screen 43 is positioned as shown to prevent by electrostatic field termination the intrusion of plasma from the anode or the cathode region into the reservoir. The laser-end connector 42 may be of ceramic material, while the bellows-type section 38 is of metal.

Brazing rings 44, 46, 48 and 50 are indicated in FIG. 7 at locations where the various sections are preferably brazed together. As is well known, such brazing rings, when heated to the appropriate temperature, exhibit a wicking action between the adjacent components to securely seal them together.

Figure 2:
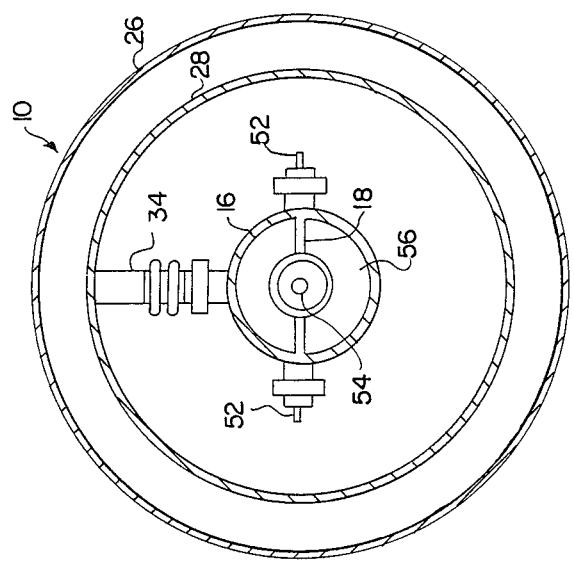
FIG. 2 is a transverse sectional view of the laser assembly, as seen along the line 2—2 in FIG. 1.

FIG. 2 shows the assembly 10 in cross-sectional view, revealing one of the gas flow tubes 34, which in this view is the gas flow tube at the cathode end of the laser. Thus, FIG. 2 shows the cathode tube 16 (which may be of 4–10 SST, kovar or other appropriate metal), the cathode filament 18 and a pair of electrical connections 52 for the filament 18.

At the center of the assembly shown in FIG. 2 is seen a mirror 54 in a mirror housing 56 secured to the cathode tube 16, forming one end of the optical cavity of the laser.

Figure 3:
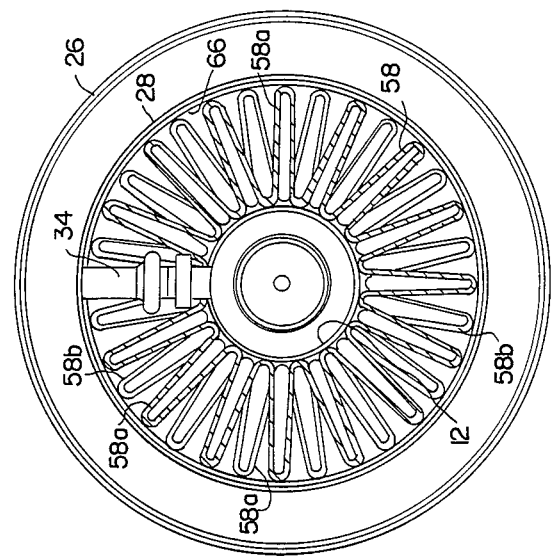
FIG. 3 is another view in transverse cross section, similar to FIG. 2, showing cooling fins forming a part of the laser construction of the invention, as seen along the line 3—3 in FIG. 1.
Figure 4:
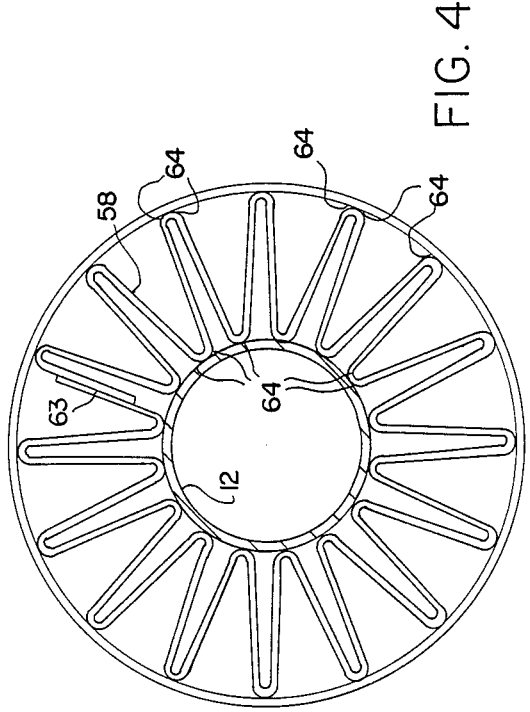
FIG. 4 is a sectional view similar to FIG. 3, but showing the construction of the cooling fins in greater detail.

As shown in FIG. 1 and also in FIGS. 3 and 4, the laser assembly of the invention preferably includes a plurality of cooling fins 58 disposed radially around the laser bore 12 and anode and cathode tubes 14 and 16. These cooling fins, preferably metal for good heat transfer, are secured in heat transfer relation to the exterior surface of the bore and tubes, 12, 14 and 16, and thereby extend out through the path of cooling air (indicated by arrows 60 in FIG. 1, although gas flow can be in either direction), flowing through an annular space 62 defined between the gas reservoir 24 and the laser bore.

The cooling fins 58 may comprise convoluted metal plates, as shown in FIG. 3, brazed to the exterior surface of the laser bore 12, as well as to the anode tube 14 and cathode tube 16. As the figures illustrate, the convoluted fins are formed in short segments in the longitudinal direction of the laser, and adjacent sections 58a and 58b may be offset rotationally from one another. This offset introduces a degree of turbulence in the cooling air, thereby significantly increasing the efficiency of cooling.

FIG. 4 is similar to FIG. 3, but shows in greater detail the construction of a set of cooling fins 58, with surrounding components simplified or eliminated for clarity. Thus, FIG. 4 does not show the adjacent set of cooling fins which would be seen beyond position of the fins illustrated, and shows only the components immediately adjacent to the set of fins 58 radially.

FIG. 4 shows that the single metal plate from which a set of fins 58 is constructed may have an overlap area 63 where the ends of the metal plate may be secured together, as by brazing or welding, although they need not be secured together. The figure also illustrates that the fins 58 may be secured at their inner side to the laser tube or bore structure 12 by brazing, as by brazing rings 64 at locations as illustrated in the drawing.

The concentric gas reservoir assembly 24, in forming the annular cooling air space 62 around the lasing cavity, tends to duct the cooling air flow so that all of the cooling air is caused to flow lengthwise through the annular space 62 in close contact with the laser cavity components. A fan or blower (not shown) is used in conjunction with the laser assembly 10, for drawing cooling air through this space.

The fins 58 greatly enhance the cooling effect of the air flow 60, by providing a very large and highly heat-conductive surface for intimate contact with the cooling air, so that heat is continually drawn away from the laser bore 12 and tubes 14 and 16. The offset relationship of the cooling fin segments (58a and 58b, as discussed above) enhances this effect by increasing the turbulence of air flow.

As shown in FIGS. 1 and 3, the assembly 10 preferably includes annularly shaped insulators 66, 68 and 70 positioned radially outwardly of the cooling fins at the laser bore 12 and at the tubes 14 and 16, between the fins and the gas reservoir 24. These insulators serve to insulate the gas reservoir from the fins both thermally and electrically. Thus, the gas reservoir 24 is kept relatively cool, with very little heat transfer from the laser bore outwardly through the fins to the gas reservoir. Also, the insulation allows the gas reservoir to be non-electric, not carrying the charge of the laser.

The embodiment shown in FIG. 1 represents a gas laser construction with internal mirror assemblies 19 and 21, at the anode and cathode ends 20 and 22 respectively. In this construction, the mirror assemblies are secured to the laser bore structure, and therefore are subjected to some thermal expansion/contraction effect on the laser cavity length between mirrors.

Figure 6:
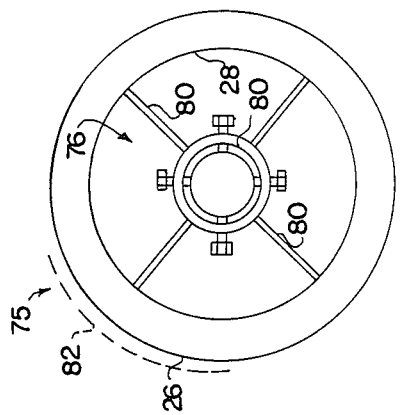
FIG. 6 is an end view of the embodiment of FIG. 5.
Figure 5:
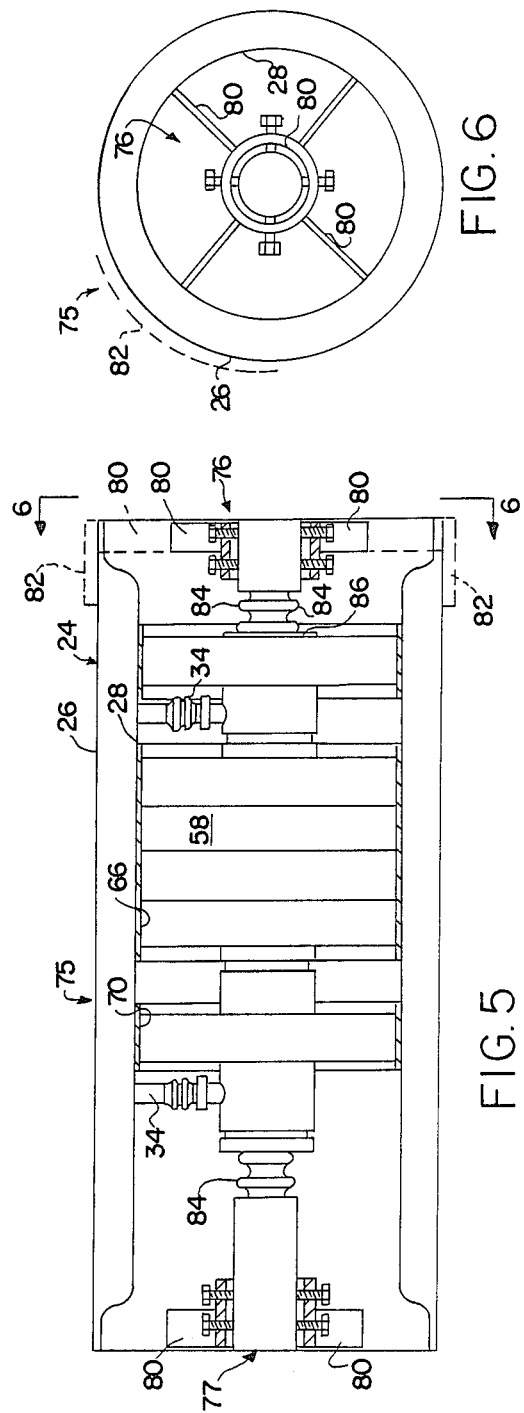
FIG. 5 is a view similar to FIG. 1, but showing another embodiment of the coaxial laser construction, wherein the annular gas reservoir serves as a resonator body supporting external mirrors of the laser cavity.

However, the embodiment illustrated in FIGS. 5 and 6 substantially reduces the thermal variation in laser cavity length, making the laser cavity extremely thermally stable. The laser assembly 75 shown in FIG. 5 is similar to the laser 10 shown in FIG. 1, except that the assembly 75 includes external mirror assemblies 76 and 77 at the anode and cathode ends of the laser. At the anode end of the laser, a series of mirror support struts 80 support the anode end mirror assembly 76. The struts 80 in turn may be secured directly to the reservoir as shown in FIGS. 5 and 6 or they may be secured rigidly to a support sleeve 82 (dashed lines) which is fixed to the gas reservoir 24 as shown in FIGS. 5 and 6. This may be by securing the support sleeve 82 externally and concentrically around the outer tube 26 of the gas reservoir 24, as indicated.

As also shown in FIG. 5, the mirror assembly 76 is isolated from the thermal expansion/contraction movement of the laser bore assembly 12, 14, 16 by a bellows assembly 84 extending between the mirror assembly 76 and an end body 86 of the laser's anode.

FIG. 6 shows the mirror support structure 80, 82 in end view. The anode end mirror assembly indicated at 76 is shown secured to a plurality of (four are shown) mirror assembly support struts 80. This mirror support assembly should be as thermally stable as possible, and components shown in FIG. 6 may be of ceramic material, metal, plastic or other materials brazed together or otherwise rigidly secured together.

As in other krypton or argon laser constructions, the laser bore 12 may comprise a ceramic such as beryllium oxide, the exterior surface of which may be metalized (as with manganese) to assure a good brazing bond with the fins 58. Alternatively, as is known, the metal-to-ceramic braze may be accomplished by active metal brazing which does not require metalizing. Such brazing can be performed with special braze alloys such as Ti Cu Si which contains titanium that tends to bind itself to the beryllium oxide or other ceramic.

The construction of the invention has several advantages. The relatively large gas reservoir 24 provides an ample supply of additional makeup plasma gas for the laser, thereby prolonging the life of lasers of this general type. The particular configuration of the gas reservoir, as a generally cylindrical body surrounding the active components of the laser, provides a streamlined shape for, incorporating the laser into various equipment and also provides an annulus of cooling air space that permits the inclusion of the cooling fins. As a further advantage, the position of the gas reservoir 24 with respect to the active laser bore components 12, 14, 16 may actually be maintained by the cooling fins 58, with the insulators positioned between the fins and the gas reservoir. Alternatively, the gas flow tubes 34 may serve as support arms between the anode and the reservoir and between the cathode and the reservoir, in which case there will be two or three such gas flow tubes at each of the anode and cathode.

By the construction of the invention shown in the embodiment of FIGS. 5 and 6, the thermal stability of the gas reservoir 26, maintained by the insulation between the fins and the reservoir, enables the gas reservoir to serve as a resonator body for the laser cavity. The external mirror assemblies (FIGS. 5 and 6) at both the anode and cathode ends are supported via the thermally stable gas reservoir, and isolated from the active laser components, which are not dimensionally stable under temperature changes, and are not as vibrationally stable, i.e., they have lower natural frequency.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a gas laser of the type which slowly consumes some of the plasma gas and includes a supplementary gas reservoir communicating with the laser bore within which lasing occurs, the laser including a resonant cavity and electrodes, the improvement comprising,
    a gas reservoir in a generally annular configuration, concentric with the laser bore and including an outer wall at the exterior of the assembly and an inner wall which define an annulus of gas reservoir space, and the reservoir having two ends which seal off the annular gas reservoir space,
    means establishing communication between the annular gas reservoir and the interior of the laser bore,
    the annular reservoir and the laser bore being substantially concentric and defining between them an annular cooling air space which is open at axially opposed ends, so that cooling air may be moved longitudinally through the length of the annular cooling space between the laser bore and the gas reservoir,
    structural means supporting the annular gas reservoir in position substantially concentrically around the laser bore, and
    wherein the gas reservoir also serves as a thermally stable resonator support structure for the laser bore.

2. In a gas laser of the type which slowly consumes some of the plasma gas and includes a supplementary gas reservoir communicating with the laser bore within which lasing occurs, the laser including a resonant cavity and electrodes, the improvement comprising,
    a gas reservoir in a generally annular configuration, concentric with the laser bore and including an outer wall at the exterior of the assembly and an inner wall which define an annulus of gas reservoir space, and the reservoir having two ends which seal off the annular gas reservoir space,
    means establishing communication between the annular gas reservoir and the interior of the laser bore,
    the annular gas reservoir and the laser bore being substantially concentric and defining between them an annular cooling air space which is open at both axially opposed ends, so that cooling air may be moved longitudinally through the length of the annular cooling space between the laser bore and the gas reservoir,
    structural means supporting the annular gas reservoir in position substantially concentrically around the laser bore,
    and further including cooling fin means connected to the exterior of the laser bore and in the path of moving air in the annular space between the bore and the reservoir, for increasing the cooling effect of the air on the laser bore.

3. The gas laser of claim 2, wherein the cooling fins serve as said structural means for supporting the gas reservoir.

4. The gas laser of claim 3, wherein an insulation barrier is positioned between the cooling fins and the inside surface of the inner wall of the gas reservoir.

5. The gas laser of claim 2, wherein the cooling fins comprise convoluted metal fins brazed to the exterior surface of the laser bore.

6. The gas laser of claim 5, wherein the cooling fins comprise a series of separate sections longitudinally with respect to the laser bore, and wherein the rotational position of each successive fin is offset from the next, so that air flowing longitudinally through the space including the fins is caused to flow turbulently, increasing the heat exchange of the air with the fins.

7. The gas laser of claim 1, wherein the gas reservoir is thermally insulated from the cooling fins, and including a pair of external mirrors supported from the reservoir and isolated from thermal expansion and contraction of the laser bore.

8. A method for supplementing the gas supply of a gas laser having a laser bore, a resonant cavity and electrodes, and also for efficiently cooling the laser bore, comprising, providing an annular gas reservoir surrounding the laser bore generally coaxially, and containing plasma gas as in the laser bore, providing gas communication means between the gas reservoir and the interior of the laser bore, so that the gas in the reservoir is always available to flow into the laser bore as needed, providing a series of cooling fins between the laser bore and the gas reservoir, in an annular air space, and securing the fins to the exterior of the laser bore in good heat conducting relationship therewith, and causing cooling air to flow longitudinally through the space containing the fins, so that the cooling air is ducted efficiently over the laser bore and the cooling fins.

9. The method according to claim 8, wherein the cooling fins comprise generally convoluted metal plates formed in relatively short longitudinal segments, with the convoluted plates offset so as to induce turbulence in the flow of cooling air thereby effecting better heat transfer between the air and the cooling fins.

10. The method according to claim 8, wherein the cooling fins are so configured and positioned as to support the annular gas reservoir in position surrounding the laser bore.

11. The method according to claim 10, further including providing an insulation barrier between the cooling fins and the surface of the annular gas reservoir.

12. The method according to claim 11, further including supporting cavity mirrors from the reservoir near its ends, so that the cavity length of the laser is thermally stable with the relatively cool eservoir, and isolating the mirrors from the thermal expansion and contraction of the laser bore.

* * * * *